April 22, 1969 J. BHARATI 3,439,908
REACTOR FOR DIRECT REDUCTION OF IRON ORE TO SPONGE IRON
Filed July 12, 1965

Inventor
Janki Bharati

By
Attorneys

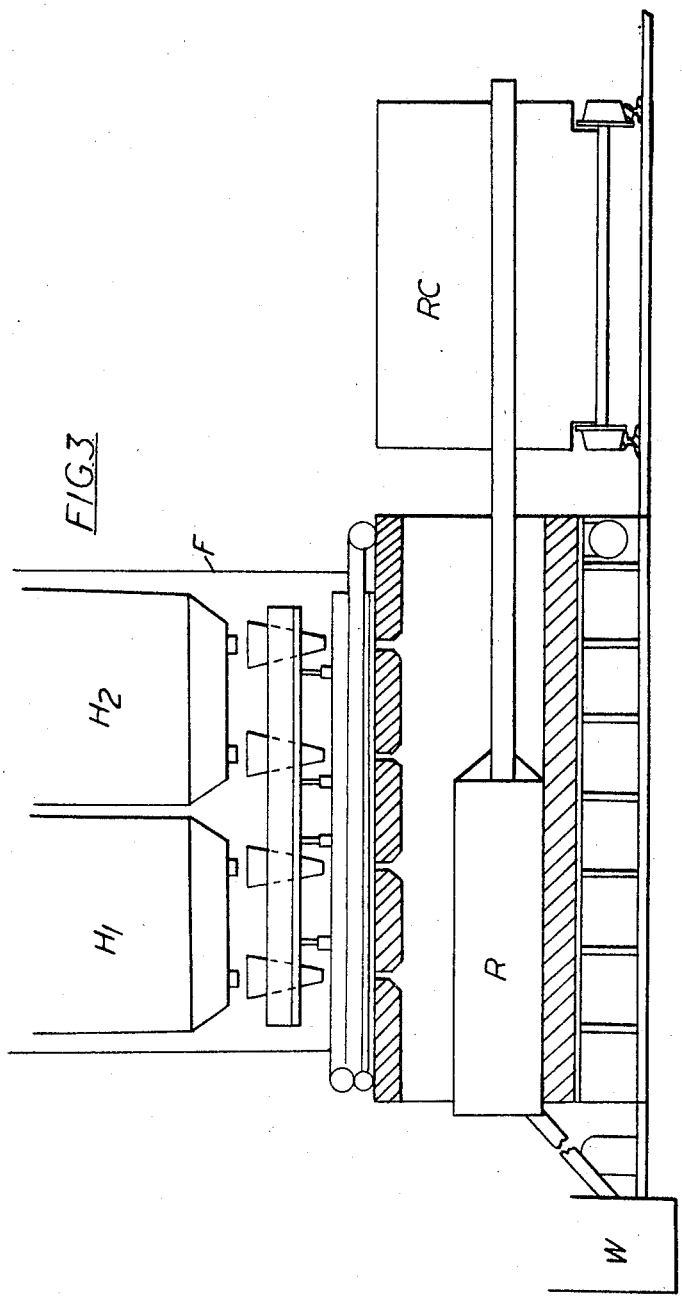

United States Patent Office 3,439,908
Patented Apr. 22, 1969

3,439,908
REACTOR FOR DIRECT REDUCTION OF IRON ORE TO SPONGE IRON
Janki Bharati, 8 Unity Hotel, Juhu, Bombay 54, India
Filed July 12, 1965, Ser. No. 471,229
Int. Cl. F27b *21/00*
U.S. Cl. 266—21    3 Claims

ABSTRACT OF THE DISCLOSURE

Relates to a reactor for the direct reduction of iron ore mixed with limestone to produce a sponge iron and comprises a reactor having a refractory brick construction and a horizontal chamber having charging holes at the top for feeding the iron ore-limestone mix, burners at the top for internal heating of the chamber, injectors located at the top for introducing reducing gas, means for ejecting said sponge ore after its production and a perforated bottom for the exit of waste gases.

---

This invention describes improvements in or relating to reactors for direct reduction of iron ore to sponge iron.

The process for reduction of iron ore to sponge iron comprises the steps of passing coal gas of specified composition through a heated charge of crushed iron ore and limestone of specified proportions, reducing the iron ore to metallic iron by said reducing action of the coal gas, cooling the reduced product, powdering it and separating pure iron powder by gravity separation or by magnetic separation from adhering impurities. The said iron powder may then be converted to pig iron or steel by well known processes or alternatively may be compressed at high temperature with mixing agents to give articles of desired shape.

The object of this invention is to enable direct reduction of iron ore to sponge iron as is required to effect one stage of the hereinbefore mentioned process.

One embodiment of the device of this invention is now described with reference to the accompanying drawings in which:

FIG. 3 is a schematic arrangement of the reactors charging and discharging system.

Figure 1:
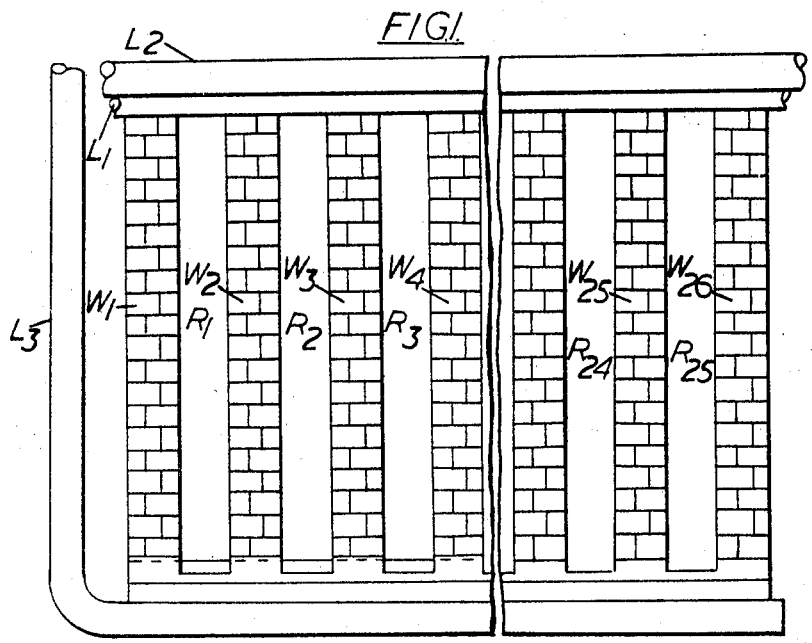
FIG. 1 shows a cross-sectional elevation view of a battery of reactors.
Figure 2:
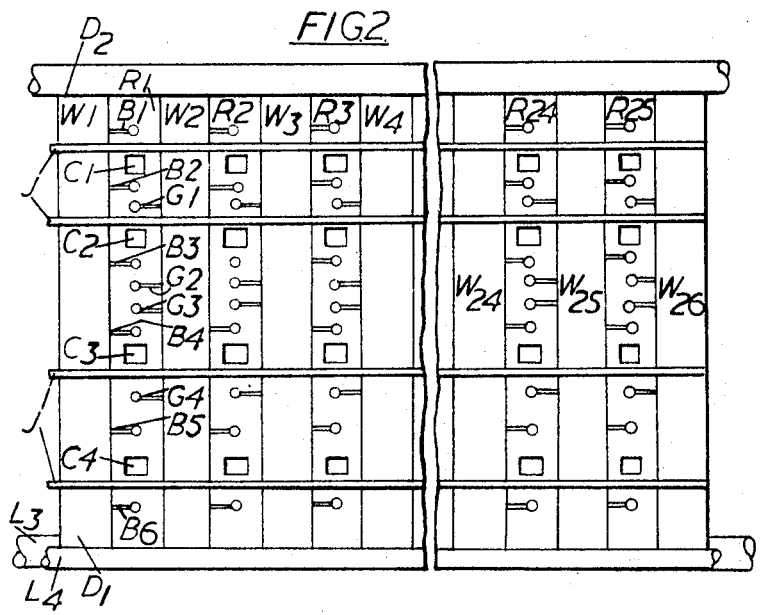
FIG. 2 is a plan view of a battery of reactors.

The description which follows refers to one embodiment of the invention.

The battery of reactors may consist of any numbers of individual reactors $R_1$, $R_2$, $R_3$ ... $R_{24}$, $R_{25}$ adjacent to one another separated by dividing walls $W_1$, $W_2$, $W_3$ ... $W_{25}$, $W_{26}$ and serviced by common charging and discharging systems to constitute a battery arrangement. The dimensions of a single reactor may be of the order of 14 ft. height, 40 ft. length and a width tapering from 19 inches to 20 inches at one end to 18 inches at the other. Solid walls of a thickness of about 24 inches separate adjacent reactors. The walls may be constructed of silica bricks or any other suitable refractory material having a fusion point over 1200° C. The ends of each reactor are covered by movable hinged doors $D_1$, $D_2$, of the type disclosed in British Patent No. 732,215 which open outwards at the time of discharging of product from the reactor.

Each reactor has charging holes which may be four in number, located at the top of the reactor, $C_1$, $C_2$, $C_3$, $C_4$. A charging car F with hoppers $H_1$, $H_2$ in which is carried the charge of iron ore mixed with limestone, moves on rails J located at the top and along the length of the battery or reactors. The charge material is carried by the charging car over the length of the battery. The car stops over the reactor to be charged and the charge descends into the reactor through drop sleeves and said charging holes $C_1$, $C_2$, $C_3$, $C_4$, provided on each reactor.

Discharging of product from the reactor after completion of the reduction process is achieved by opening the end doors $D_1$, $D_2$ and using mechanically operated ram R to push the product out of the reactor on to the wharf W from where the product may be conveyed away in rail wagons. One mobile ram car RC serves the entire battery. The ram is introduced through the narrower end of the reactor.

Each reactor has six burners $B_1$, $B_2$, $B_3$, $B_4$, $B_5$, $B_6$, located at the top of the reactor, the burners being fed with fuel oil and combustion air which are drawn through flow control valves from main fuel oil line $L_1$ and main air line $L_2$. The combustion air may be preheated by heat exchange with waste flue gas which exits from the main flue gas outlet line $L_3$ to a chimney. The bottom of each reactor has half inch square openings through which the waste gas is drawn out into the line $L_3$.

Each reactor is also provided at the top with four inlet connections $G_1$, $G_2$, $G_3$, $G_4$, through which reducing gas is injected into the reactor. The reducing gas is drawn through flow control valves from the main reducing gas line $L_4$ to the injectors of each reactor. The reducing gas employed may be carbon monoxide, hydrogen, hydrocarbons singly or in any combination thereof.

By the process of this invention, the empty reactors are initially heated internally to 900–1100° C. by burning fuel oil. The burners are then stopped and sized iron ore or agglomerates of iron ore fines, mixed with 5% by weight of limestone, is charged into the reactors. Thereafter, reducing gas is passed through the charged reactors and after reduction is complete, the sponge iron product is discharged from the reactors by the ram on to the wharf. The sponge iron product is then cooled in a closed wagon or is dry-quenched after which it is finely crushed and subjected to gravity and magnetic separation to separate out the pure sponge iron desired from the adhering gangue. The pure sponge iron produced by this invention may then be briquetted or converted to pig iron, steel or other alloys as required.

I claim:

1. A reactor for direct reduction of iron ore mixed with limestone to give sponge iron said reactor being a refractory brick construction and comprising a horizontal chamber having hinged doors at each end thereof, charging holes at the top for feeding the iron ore-limestone mix, burners at the top for internal heating of the chamber, injectors located at the top for introducing reducing gas, a perforated bottom for exit of waste gases and means for ejecting said sponge from said chamber along the axis thereof.

2. A reactor as in claim 1 wherein the iron ore-limestone charge is introduced by a mobile charging car.

3. A reactor as in claim 1 wherein the reducing gas is hydrogen, carbon monoxide, hydrocarbons singly or in any combination thereof.

References Cited

UNITED STATES PATENTS

| | | | |
|---|---|---|---|
| 1,827,413 | 10/1931 | Ament | 214—23 |
| 2,252,714 | 8/1941 | Hall | 266—20 X |
| 2,252,807 | 8/1941 | Haberle et al. | 214—23 |
| 2,609,948 | 9/1952 | Lavely | 214—23 |
| 2,750,272 | 6/1956 | Lellep | 266—21 X |
| 2,507,076 | 5/1950 | Wilde | 25—142 |
| 3,351,687 | 11/1967 | Thome et al. | 25—142 |

FOREIGN PATENTS 732,215  6/1955  Great Britain.

J. SPENCER OVERHOLSER, *Primary Examiner.*

EUGENE MAR, *Assistant Examiner.*

U.S. Cl. X.R.

75—34; 214—23